W. S. PIRIE.
KNUCKLE FOR CAR COUPLINGS.
APPLICATION FILED JAN. 17, 1908.
921,158.
Patented May 11, 1909.
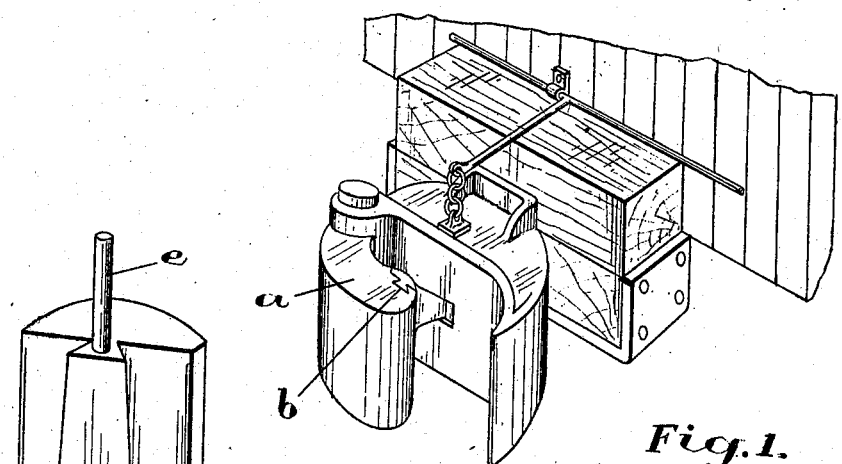
Fig. 1.
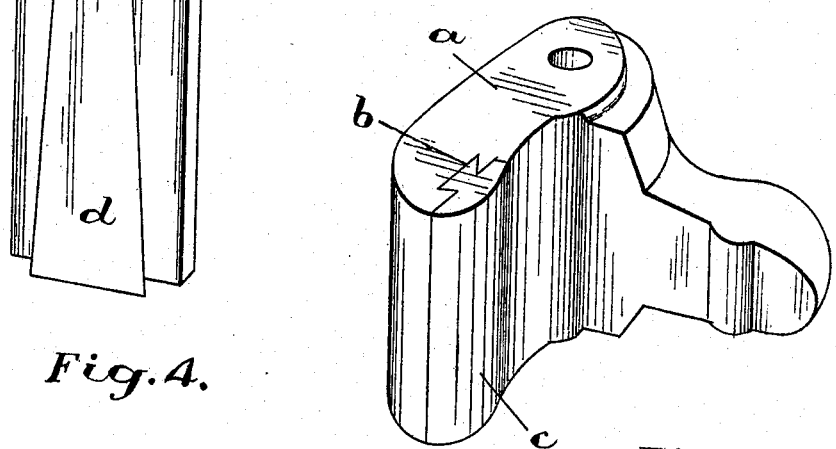
Fig. 4.
Fig. 2.
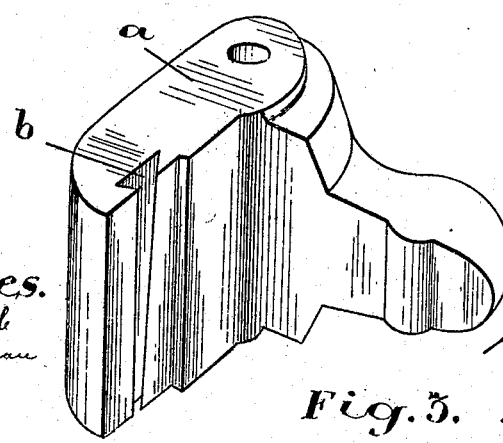
Witnesses.
Inventor:
Fig. 3.

UNITED STATES PATENT OFFICE.

WALTER SCOTT PIRIE, OF HALIFAX, NOVA SCOTIA, CANADA.

KNUCKLE FOR CAR-COUPLINGS.

No. 921,158.    Specification of Letters Patent.    Patented May 11, 1909.

Application filed January 17, 1908. Serial No. 411,261.

*To all whom it may concern:*

Be it known that I, WALTER SCOTT PIRIE, of the city of Halifax, in the county of Halifax and Province of Nova Scotia, Dominion of Canada, have invented certain new and useful Improvements in Knuckles for Car-Couplers; and I hereby declare that the following is a full, clear, and exact description of the same.

It has been found in the field of actual use that the principal wear of the car coupler occurs on the face of the knuckle which, when worn even to a very limited extent, becomes wholly useless and is of no commercial value except as scrap iron.

The object of the present invention is to provide the knuckle with a removable wear member so positioned that it receives the impact, and is exposed to the wear of the parts as they come together and when coupled. In carrying out this object the knuckle is formed with a dove tail groove tapering from its top to its bottom surface, and contained in the dove tail groove is the dove tail of the wear member, having a stud at its lower end bent into place to securely lock the wear member in its seat, the wearing surface of the wear member being preferably of an arc shape so that its greatest depth will be positioned where the greatest wear occurs, as hereinafter set forth and particularly pointed out in the claim.

For a full understanding of the invention reference is to be had to the following description and to the accompanying drawings in which:—Figure 1 represents a perspective view of a car coupler. Fig. 2 is a perspective view of the knuckle with the removable wear member secured in place. Fig. 3 is a perspective view of the knuckle with the wear member removed. Fig. 4 is a perspective view of the wear member inverted.

Like characters of reference refer to like parts throughout the specification and drawings.

In the inner face of the knuckle $a$ is a dove tailed groove $b$ tapering from the top to the bottom surface of the knuckle. The knuckle $a$ is provided with a wear member $c$ formed with a dove tail $d$ to enter the dove tail groove $b$ and secure the wear member $c$ to the knuckle. At the lower end of the wear member is to be a stud $e$ which is bent into position against the adjacent surface of the knuckle $a$ to fasten the wear member in its seat. The impact of the car couplers as they come together, and the wear of the parts when the couplers are connected is received by the wear member $c$ and when the wear member, becomes so worn as to be useless, or becomes injured it can be removed and replaced by another. The average life of a knuckle is 90 days and the approximate cost of the knuckle is $3.15. The approximate life of the wear member is 90 days and the approximate cost is 30 cents. By employing the wear member the life of the knuckle with the exception of the wear member is practically unlimited, and an approximate saving of $2.85 can be effected every 90 days in the use of each car coupler.

Having thus fully described my invention what I claim as new and desire to secure by Letters Patent is:—

The hereinbefore described device consisting of a car coupler knuckle having a dove tail groove therein, a wear member having a dove tail to enter the dove tail groove, a locking means to fasten the wear member to the knuckle, said locking means consisting of a stud at the lower end of the wear member adapted to be bent against the adjacent end of the knuckle.

Halifax, Nova Scotia, January 14th, 1908.

WALTER SCOTT PIRIE.

Signed in the presence of—
LAURA B. TAYLOR,
ALFRED G. CUMMINGS.